Patented Mar. 19, 1935

1,994,955

UNITED STATES PATENT OFFICE 1,994,955

ACID SYNTHESIS PROCESS

Alfred T. Larson, Wilmington, Del., assignor to E. I. du Pont de Nemours & Company, Wilmington, Del., a corporation of Delaware No Drawing. Application January 14, 1933
Serial No. 651,858

10 Claims. (Cl. 260—116)

This invention relates to a process for improving the synthesis of organic acids and more particularly to a process for improving the preparation of organic acids by synthesis from alcohols and carbon monoxide and from olefinic hydrocarbons and carbon monoxide.

The synthesis of organic acids, esters, and ethers, from alcohols and carbon monoxide is well known as, for example, the preparation of acetic acid from methanol and carbon monoxide. These syntheses are conducted ordinarily in the vapor phase and in the presence of a suitable catalyst. Fair yields are usually obtainable although byproducts are formed, due generally to oxidization of the reactants. Many of these by-products have little or no present sale value and consequently the processes have been considered of little interest for commercial preparation of these compounds. Equally important are the corrosion difficulties which are encountered owing to the corrosive nature of the products made as well as the type of catalysts used, which latter are generally of an acidic nature. Catalyst life has likewise been very short, necessitating frequent shutdowns.

Similar difficulties, together with polymerization of the unsaturated bodies, have been encountered in the synthesis of organic acids by the interaction of the olefinic hydrocarbons, for example, propionic acid from ethylene, and carbon monoxide, which synthesis is likewise ordinarily carried out in the presence of an acid catalyst. These syntheses and catalysts therefor have been disclosed in copending applications Ser. Nos. 545,857 and 519,239.

An object of the present invention is to provide an improved process for the synthesis of organic acids wherein many of the above mentioned difficulties of operation have been overcome. A further object of the invention is to provide a process wherein organic acids may be prepared from alcohols and carbon monoxide or from olefinic hydrocarbons and carbon monoxide in which polymerization, catalyst degradation, and corrosion of the apparatus is inhibited. A still further object of the invention is to provide a process for organic acid synthesis in which oxygen is substantially entirely eliminated from the system. Other objects and advantages will hereinafter appear.

Substantially all difficulties resulting from polymerization and corrosion are eliminated and catalyst life considerably extended in organic acid synthesis generally, and particularly in organic acid synthesis wherein alcohols or olefinic hydrocarbons are reacted with CO to give the acid, if oxygen is kept out of the system. For example, in the preparation of propionic acid from ethylene, CO, and steam and in which hydrogen chloride is used as the catalyst for accelerating the reaction, if the olefine, CO, and steam are rendered free from oxygen prior to injection into the system, little or no corrosion results from the presence of the inorganic acid catalyst or the organic acid produced and practically no polymerization of the ethylene occurs.

Any suitable method may, of course, be employed for freeing the reactants from oxygen prior to their entering the synthesis, but I have found that in the acid synthesis from olefines and carbon monoxide and from alcohols and carbon monoxide, the gaseous constituents, i. e. the olefine, CO, or any inert gases that may be recirculated with the reactants, may be substantially completely deoxygenated by scrubbing them at ordinary temperature and under a slight pressure, say, of approximately one atmosphere with an oxygen absorbent, such as the Fieser solution, which may be prepared as follows:

In 86.4 lbs. of a 30% sodium hydroxide solution 2.7 ounces of the sodium salt of anthroquinone betasulfonic acid is dissolved. There is then added 12.6 lbs. of sodium hydrosulfide—$Na_2S_2O_4.2H_2O$. Other solutions, of course, may be used for freeing the gases of oxygen, but the above oxygen absorbent has been found particularly efficient.

The alcohols and water used in acid synthesis processes and like materials should similarly be freed from oxygen prior to injecting them into the reaction. This can be accomplished readily by a scrubbing operation in which the alcohols and water in the liquid phase are passed countercurrent to the flow of a gas such as nitrogen or carbon monoxide, or any inert gas, the absorption of which in the oxygen freed liquid will not interfere with the reaction.

*Example.*—A gaseous mixture was prepared containing by volume 95% carbon monoxide, and 5% ethylene, together with steam to give a steam:carbon monoxide and ethylene ratio of approximately 0.25, the steam being derived from the injection of an appropriate amount of a 1% aqueous solution of ammonium chloride to give this steam:gas ratio, the reactants all being freed of oxygen by the methods disclosed above. The resulting oxygen-free gaseous mixture was passed into a conversion chamber designed for carrying out exothermic gaseous reactions and in which activated charcoal was disposed. The temperature of the reaction was maintained at approximately 325° C. while the pressure was held at approximately 700 atmospheres. A 75% yield of propionic acid was obtained together with other aliphatic acids.

After purifying the constituents, they are subjected to the acid synthesis in accord with any of the suitable processes therefor. It is, of course, understood that when conducting acid synthesis in accord with this invention the apparatus used should be constructed of materials, which, under ordinary temperature and pressure conditions, are not appreciably attacked by the acid catalyst employed or the acid products produced, such, for example, as the alloy steels containing molybdenum, cobalt, tungsten, manganese, nickel, etc. It will be found that when utilizing such materials of construction little or no corrosion will be effected in the absence of oxygen, but when oxygen is present due to the high temperature of the reaction and the high pressures usually employed no materials of construction other than glass, which, of course, is unsuited for commercial installations, have been found which will not be rapidly corroded.

I have designated liquids as usually preferred as a medium in which to absorb oxygen from the reactants that are normally gaseous; solids such, for example, as hot copper, gauze or pellets, however, may likewise be employed, if desired. Any other suitable solid oxygen absorbent may also be used.

It will be understood that any process involving acid synthesis and in which oxygen is eliminated from the products prior to their injection into the reaction zone or any process involving acid synthesis during which oxygen is eliminated completely will come within the scope of this invention without sacrificing any of the advantages that may be derived therefrom.

I claim:

1. In a vapor phase process for the preparation of aliphatic organic acids by the interaction of an olefinic hydrocarbon, carbon monoxide, and steam in the presence of a catalyst adapted to effect the reaction, the steps which comprise scrubbing the olefinic hydrocarbon and carbon monoxide with an oxygen-absorbing liquid and the water prior to vaporization with an oxygen-absorbing gas before introducing these reactants, thus rendered substantially oxygen-free, into the reaction zone.

2. In a vapor phase process for the preparation of aliphatic organic acids by the interaction of an aliphatic alcohol, carbon monoxide, and steam in the presence of a catalyst adapted to effect the reaction, the steps which comprise scrubbing the carbon monoxide with an oxygen-absorbing liquid, and the aliphatic alcohol and water prior to vaporization with an oxygen-absorbing gas, before introducing them, thus rendered substantially oxygen-free, into the reaction zone.

3. In a vapor phase process for the preparation of propionic acid by the interaction of ethylene, carbon monoxide, and steam in the presence of an acid catalyst adapted to effect the reaction, the steps which comprise scrubbing the ethylene and carbon monoxide with an oxygen-absorbing liquid, and the water before vaporization with an oxygen-absorbing gas, prior to introducing them, thus rendered substantially oxygen-free, into the reaction zone.

4. In a vapor phase process for the preparation of acetic acid by the interaction of methanol, carbon monoxide, and steam in the presence of an acid catalyst adapted to effect the reaction, the steps which comprise scrubbing the carbon monoxide with an oxygen absorbing liquid, and the methanol and water, before vaporization, with an oxygen absorbing gas, prior to introducing them, thus rendered substantially oxygen-free, into the reaction zone.

5. In an improved process of manufacturing organic acids by the interaction of carbon monoxide and a compound selected from the group consisting of aliphatic alcohols and olefinic hydrocarbons in the presence of a catalyst capable of causing the formation of organic acids by the said interaction with steam, the step of completely excluding oxygen from the reaction.

6. The method of extending catalyst life and inhibiting corrosion and polymerization during the preparation of organic acids from carbon monoxide and compounds selected from the group consisting of alcohols and olefinic hydrocarbons in the presence of steam, which comprises freeing the reactants from free oxygen prior to passing them into the apparatus.

7. In a vapor phase process for the preparation of an aliphatc carboxylic organic acid by the interaction of an olefinic hydrocarbon, carbon monoxide, and steam in the presence of a catalyst adapted to effect the reaction the step which comprises conducting the reaction in the substantial absence of free oxygen.

8. In a vapor phase process for the preparation of an aliphatic carboxylic organic acid by the interaction of an aliphatic alcohol, carbon monoxide, and steam in the presence of a catalyst adapted to effect the reaction, the step which comprises conducting the reaction in the substantial absence of free oxygen.

9. In a vapor phase process for the preparation of propionic acid by the interaction of ethylene, carbon monoxide, and steam in the presence of an acid catalyst adapted to effect the reaction, the step which comprises conducting the reaction in the substantial absence of free oxygen.

10. In a vapor phase process for the preparation of acetic acid by the interaction of methanol, carbon monoxide, and steam in the presence of an acid catalyst adapted to effect the reaction, the step which comprises conducting the reaction in the substantial absence of free oxygen.

ALFRED T. LARSON.